United States Patent
Kanamarlapudi et al.

(10) Patent No.: US 9,369,926 B2
(45) Date of Patent: Jun. 14, 2016

(54) METHOD AND APPARATUS FOR HANDOVER VOLTE CALL TO UMTS PS-BASED VOICE CALL

(71) Applicant: QUALCOMM Incorporated, San Diego, CA (US)

(72) Inventors: Sitaramanjaneyulu Kanamarlapudi, San Diego, CA (US); Liangchi Hsu, San Diego, CA (US); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/167,728

(22) Filed: Jan. 29, 2014

(65) Prior Publication Data

US 2014/0334442 A1 Nov. 13, 2014

Related U.S. Application Data

(60) Provisional application No. 61/821,007, filed on May 8, 2013.

(51) Int. Cl.
*H04W 36/00* (2009.01)

(52) U.S. Cl.
CPC ................................ *H04W 36/0022* (2013.01)

(58) Field of Classification Search
CPC .......................... H04W 36/0022; H04W 36/00
See application file for complete search history.

(56) References Cited

U.S. PATENT DOCUMENTS

| | | | |
|---|---|---|---|
| 6,697,352 B1* | 2/2004 | Ludwig et al. | 370/349 |
| 2004/0052234 A1* | 3/2004 | Ameigeiras et al. | 370/338 |
| 2005/0073989 A1* | 4/2005 | Wang et al. | 370/349 |
| 2006/0252452 A1* | 11/2006 | Umesh | H04W 28/18 455/550.1 |
| 2008/0225765 A1* | 9/2008 | Marinier et al. | 370/310 |

(Continued)

OTHER PUBLICATIONS

"Digital cellular telecommunications system (Phase 2+); Universal Mobile Telecommunications Systems (UMTS); LTE; Single Radio Voice Call Continuity (SRVCC); Stage 2 (3GPP TS 23.216 version 10.1.0 Release 10)", Technical Specification, European Telecommunications Standards Institute (ETSI), 650, Route Des Lucioles; F-06921 Sophia-Antipolis; France, vol. 3GPP SA 2, No. V10.1.0, Jun. 1, 2011, XP014065841 (45 pages).

(Continued)

*Primary Examiner* — Mohammad Anwar
(74) *Attorney, Agent, or Firm* — Arent Fox LLP

(57) ABSTRACT

Aspects of the methods and apparatus relate to transferring a received Voice-over-Long Term Evolution (VoLTE) call to a High Speed Packet Access (HSPA) packet-switched (PS) based voice call. One aspect of the methods and apparatus include receiving a VoLTE call from a network and identifying uplink VoLTE handover characteristics of the VoLTE call for an uplink transmission to the network and a downlink VoLTE handover characteristics for a downlink transmission from the network. The aspect includes configuring uplink HSPA PS based handover characteristics that emulate the uplink VoLTE handover characteristics for the uplink transmission and configuring downlink HSPA PS based handover characteristics that emulate the downlink VoLTE handover characteristics for the downlink transmission. The aspect includes utilizing the uplink HSPA PS based handover characteristics during the uplink transmission to the network and utilizing the downlink HSPA PS based handover characteristics during the downlink transmission from the network.

28 Claims, 10 Drawing Sheets

(56) References Cited

U.S. PATENT DOCUMENTS

| | | | |
|---|---|---|---|
| 2009/0201884 | A1 | 8/2009 | Chaponniere |
| 2010/0040020 | A1 | 2/2010 | Chen |
| 2010/0208670 | A1 | 8/2010 | Zisimopoulos et al. |
| 2010/0296484 | A1 | 11/2010 | Wu |
| 2011/0044198 | A1 | 2/2011 | Persson et al. |
| 2011/0134829 | A1* | 6/2011 | Chen et al. ............... 370/328 |
| 2012/0051327 | A1* | 3/2012 | Persson et al. ............ 370/331 |
| 2013/0044613 | A1 | 2/2013 | Edara et al. |
| 2013/0094472 | A1 | 4/2013 | Klingenbrunn et al. |
| 2013/0201890 | A1 | 8/2013 | Swaminathan et al. |
| 2013/0242942 | A1 | 9/2013 | Stille |

OTHER PUBLICATIONS

Ericsson: "Handling of unrecognized QCIs", 3GPP Draft; S2-090959, 3rd Generation Partnership Project (3GPP), Mobile Competence Centre; 650, Route Des Lucioles; F-06921 Sophia-Antipolis Cedex; France, no. Budapest; Feb. 10, 2009, XP050333398 (2 pages).

International Search Report and Written Opinion, dated Oct. 6, 2014, issued in corresponding International Patent Application No. PCT/US2014/034805 (16 pages).

Nokia et al: "Qos Profile Mapping during mobility from E-UTRAN to UTRAN/GERAN", 3GPP Draft; S2-081493 UMTS QoS Mapping in IRAT Mob, 3rd Generation Partnership Project (3GPP), Mobile Competence Centre; 650, Route Des Lucioles; F-06921 Sophia-Antipolis Cedex; France, vol. SA WG2, no. Athens; Feb. 8, 2008, XP050263863 (2 pages).

Nokia Siemens Networks et al: "VoLTE and VoHSPA capability indication", 3GPP Draft; R2-121113 (Voice Capability), 3rd Generation Partnership Project (3GPP), Mobile Competence Centre; 650, Route Des Lucioles; F-06921 Sophia-Antipolis Cedex; France, vol. RAN WG2, no. Jeju, South Korea; Mar. 26, 2012-Mar. 30, 2012, Mar. 18, 2012, XP050605885 (4 pages).

Delivering Voice Using HSPA, 4G Americas, Feb. 2012, 26 pages.

* cited by examiner

METHOD AND APPARATUS FOR HANDOVER VOLTE CALL TO UMTS PS-BASED VOICE CALL

CLAIM OF PRIORITY UNDER 35 U.S.C §119

The present Application for patent claims priority to U.S. Provisional Application No. 61/821,007 entitled "METHOD AND APPARATUS FOR HANDOVER VoLTE CALL TO UMTS PS-BASED VOICE CALL" filed May 8, 2013, and assigned to the assignee hereof and hereby expressly incorporated by reference.

BACKGROUND

Aspects of the present disclosure relate generally to wireless communication systems, and more particularly, to transferring a Voice-over-Long Term Evolution (VoLTE) call to a Universal Mobile Telecommunications System (UMTS) packet switched (PS) based voice based call.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the UMTS, a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Generally, delivering a PS Handover based Voice-over-Internet Protocol (VoIP) over High Speed Packet Access (HSPA) from a VoLTE call without Quality-of-Service (QoS) implementation in the HSPA radio access network is challenging because of the need to sustain jitter/delay-sensitivity voice requirements. Thus, there is a need for transferring a VoLTE call to a UMTS (or an HSPA) PS based voice call with minimal reduction in voice traffic, thereby providing consistent service in a wireless communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication includes receiving a VoLTE call from a network and identifying uplink VoLTE handover characteristics of the VoLTE call for an uplink transmission to the network and downlink VoLTE handover characteristics for a downlink transmission from the network. Additionally, the method includes configuring uplink HSPA PS based handover characteristics that emulate the uplink VoLTE handover characteristics for the uplink transmission to the network and configuring downlink HSPA PS based handover characteristics that emulate the downlink VoLTE handover characteristics for the downlink transmission from the network. Furthermore, the method includes utilizing the uplink HSPA PS based handover characteristics during the uplink transmission to the network and utilizing the downlink HSPA PS based handover characteristics during the downlink transmission from the network.

In another aspect, an apparatus for wireless communication includes at least one processor and a memory coupled with the at least one processor, where the at least one processor is configured to receive a VoLTE call from a network and identify uplink VoLTE handover characteristics of the VoLTE call for an uplink transmission to the network and downlink VoLTE handover characteristics for a downlink transmission from the network. Additionally, the at least one processor is configured to configure uplink HSPA PS based handover characteristics that emulate the uplink VoLTE handover characteristics for the uplink transmission to the network and configure downlink HSPA PS based handover characteristics that emulate the downlink VoLTE handover characteristics for the downlink transmission from the network. Furthermore, the at least one processor is configured to utilize the uplink HSPA PS based handover characteristics during the uplink transmission to the network and utilizing the downlink HSPA PS based handover characteristics during the downlink transmission from the network.

In another aspect, an apparatus for wireless communication includes means for receiving a VoLTE call from a network and means for identifying uplink VoLTE handover characteristics of the VoLTE call for an uplink transmission to the network and downlink VoLTE handover characteristics for a downlink transmission from the network. Additionally, the apparatus includes means for configuring uplink HSPA PS based handover characteristics that emulate the uplink VoLTE handover characteristics for the uplink transmission to the network and means for configuring downlink HSPA PS based handover characteristics that emulate the downlink VoLTE handover characteristics for the downlink transmission from the network.

In yet another aspect, a non-transitory computer-readable media for wireless communication includes machine-executable code for causing a computer to receive a VoLTE call from a network and identify uplink VoLTE handover characteristics of the VoLTE call for an uplink transmission to the network and downlink VoLTE handover characteristics for a downlink transmission from the network. Additionally, the code may be executable for causing a computer to configure uplink HSPA PS based handover characteristics that emulate the uplink VoLTE handover characteristics for the uplink transmission to the network and configure downlink HSPA PS based handover characteristics that emulate the downlink VoLTE handover characteristics for the downlink transmission from the network. Furthermore, the code may be executable for causing a computer to utilize the uplink HSPA PS based handover characteristics during the uplink transmission to the network and utilizing the downlink HSPA PS based handover characteristics during the downlink transmission from the network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, a VoLTE scheme is a system for transferring voice traffic over Long Term Evolution (LTE). The VoLTE scheme enables simultaneous communication of voice and data traffic within a wireless communication system. It provides operators with an end-to-end internet protocol (IP) connection between their mobile equipment and their core network.

Currently, an operation of delivering a packet switched (PS) Handover based VoIP over HSPA from a VoLTE call without QoS implementation in the HSPA radio access network may be considered challenging and time consuming. As such, according to aspects of the present apparatus and method, there is provided a simplified mechanism for a VoLTE call to be reconfigured in such a manner that the VoLTE call can be transferred into UMTS PS domain with minimal reduction in voice traffic. By emulating certain HSPA radio control link (RCL) characteristics during uplink mode and downlink mode, consistent service in a wireless communication system may be provided when transferring a VoLTE call to a UMTS (or an HSPA) PS based voice call.

However, when transferring a VoLTE call to a UMTS (or an HSPA) PS based voice call, the requirements for the reconfiguration may need to meet a certain quality and logistical criteria in order to maintain a desired level of call quality. As such, aspects of the present apparatus and method provide a mechanism for minimizing or reducing loss of voice traffic due to AM radio block (RB) or high speed (HS) Channel logistics, a mechanism where voice frames may not to be requested for retransmission in the downlink and in the uplink since there may not be an equivalent of a jitter management block that may be utilized to decrease jitter in a VoLTE call present in a UMTS call, and a mechanism that may inform the network about the VoLTE call transfer.

Figure 1:
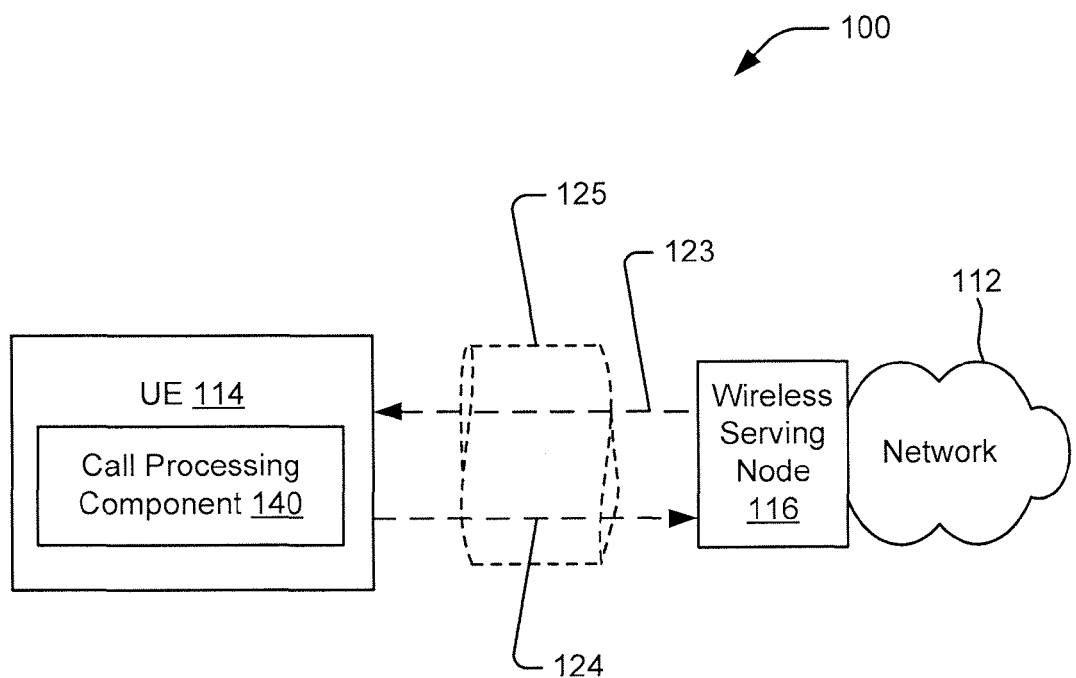
FIG. 1 is a schematic diagram illustrating an aspect of a call processing component in a wireless communication system.

Referring to FIG. 1, in one aspect, a wireless communication system 100 is configured to facilitate transmitting a vast amount of data from a mobile device to a network. Wireless communication system 100 includes at least one UE 114 that may communicate wirelessly with one or more networks 112 via a respective one or more serving nodes, including, but not limited to, wireless serving node 116 over one or more wireless link 125. The one or more wireless links 125, may include, but are not limited to, signaling radio bearers and/or data radio bearers. Wireless serving node 116 may be configured to transmit one or more signals 123 to UE 114 over the one or more wireless links 125, and/or UE 114 may transmit one or more signals 124 to wireless serving node 116. In an aspect, signal 123 and signal 124 may include, but are not limited to, one or more messages, which may transmit data or signaling from the UE 114 to the network via wireless serving node 116. According to the present aspects, UE 114 may further include a call processing component 140 configured to transfer a VoLTE call to a UMTS PS based voice call. For example, in an aspect, call processing component 140 may be configured to modify HSPA PS based data service handover characteristics of UE 114 that emulate VoLTE handover characteristics during the uplink transmission and the downlink transmission to network 112 for the VoLTE call. HSPA PS based data service handover characteristics and VoLTE handover characteristics may refer to handover schemes for radio access networks relating to data loss minimization, interference suppression, packet delay minimization and to minimize network signaling, etc., between UE 114 and network 112.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 2:
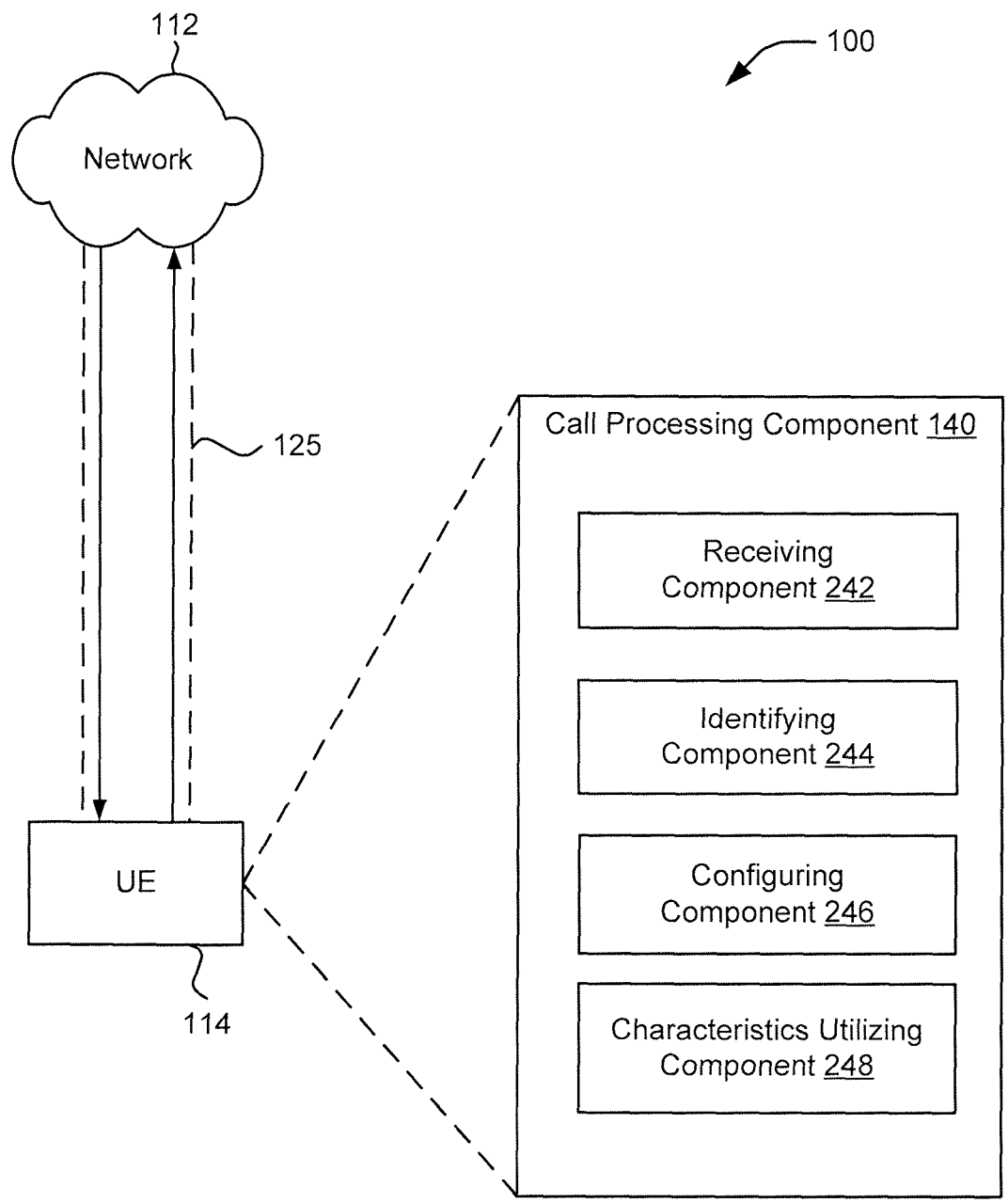
FIG. 2 is a schematic diagram illustrating a more detailed aspect of the call processing component of FIG. 1.

Referring to FIG. 2, in an aspect of the present apparatus and method, a wireless communication system 100 is configured to include wireless communications between network 112 and UE 114. The wireless communications system may be configured to support communications between a number of users. FIG. 2 illustrates a manner in which network 112 communicates with UE 114 over wireless link 125. The wireless communication system 100 can be configured for downlink message transmission or uplink message transmission, as represented by the up and down arrows between network 112 and UE 114.

In an aspect, within the UE 114 resides a call processing component 140. The call processing component 140 may be configured, among other things, to include a receiving component 242 capable of receiving a VoLTE call from a network, an identifying component 244 capable of identifying uplink VoLTE handover characteristics of the VoLTE call for an uplink transmission to the network and a downlink VoLTE handover characteristics for downlink transmission from the network. The call processing component 140 may also include a configuring component 246 that may rely on identified VoLTE handover characteristics to configure uplink HSPA PS based handover characteristics that emulate the uplink VoLTE handover characteristics for the uplink transmission to the network and to configure downlink HSPA PS based handover characteristics that emulate the downlink VoLTE handover characteristics for the downlink transmission from the network. Characteristics utilizing component 248, located within call processing component 140, may then utilize the uplink HSPA PS based handover characteristics, configured by configuring component 246, during the uplink transmission to the network and utilize the downlink HSPA PS based handover characteristics, configured by configuring component 246, during the downlink transmission from the network in order to complete transferring a VoLTE call to a UMTS PS based voice call.

Figure 3:
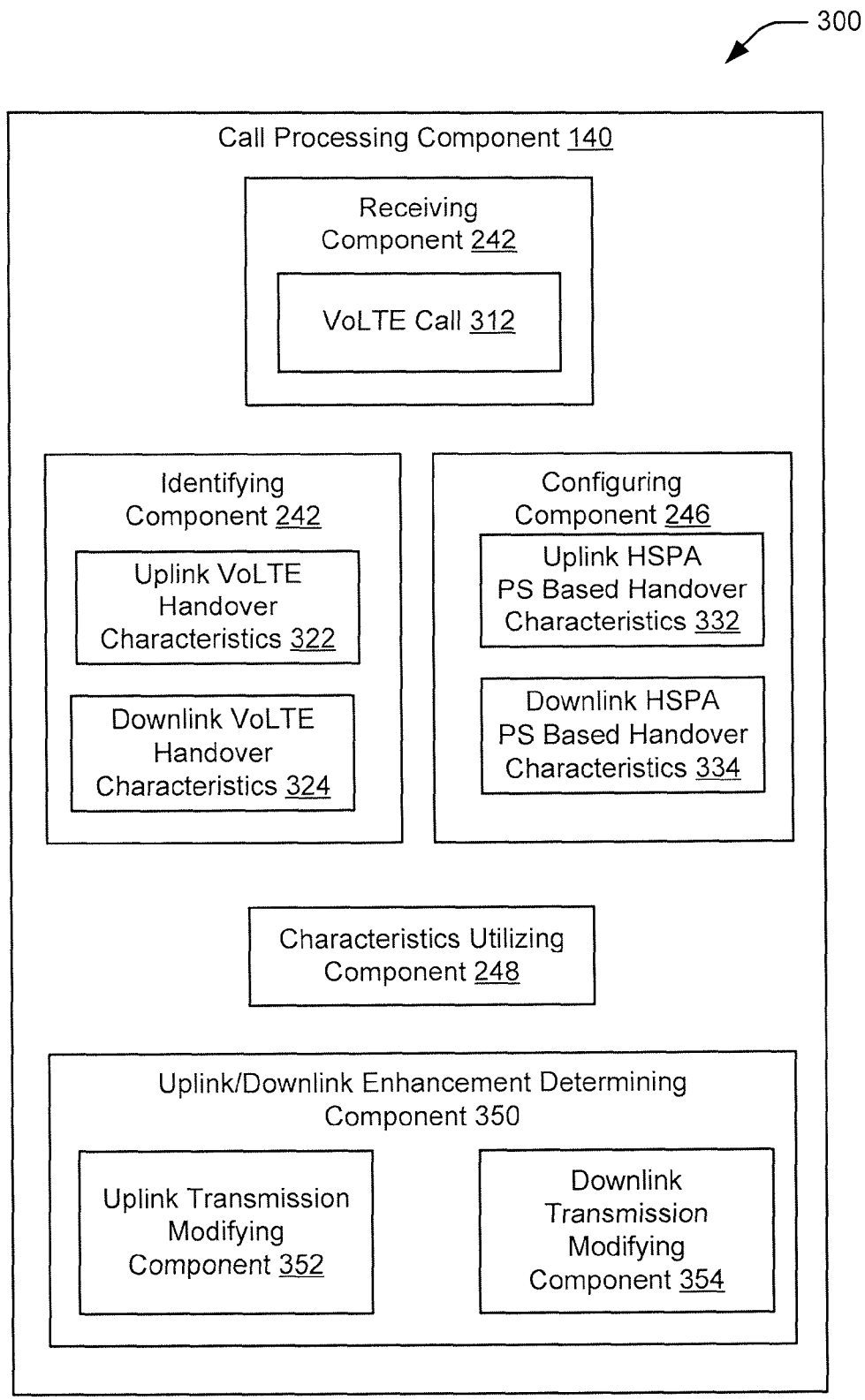
FIG. 3 is a schematic diagram illustrating a more detailed aspect of the components of the call processing component of FIG. 1.

Referring to FIG. 3, a more detailed aspect of the call processing component 140, of FIGS. 1 and 2, may be defined which include additional components that inter-operate to transfer a VoLTE call to a UMTS PS based voice call to provide consistent service for UE 114. In this aspect, call processing component 140 may be configured to include receiving component 242 capable of receiving a VoLTE call from a network. For example, receiving component 242, located within UE 114, may be configured to receive VoLTE call 312 from network 112 via wireless serving node 116 over wireless link 125. As discussed above, a VoLTE call is a means by which end-to-end IP connection between UE 114 and core network 112 may simultaneously communicate both voice and data traffic.

In another aspect, call processing component 140 is configured to include identifying component 244 capable of identifying uplink VoLTE handover characteristics of the VoLTE call for an uplink transmission to the network and downlink VoLTE handover characteristics for a downlink transmission from the network. For example, during a VoLTE call with network 112, UE 114 may identify uplink VoLTE handover characteristics 322 of VoLTE call 312 for an uplink transmission to network 112 and downlink VoLTE handover characteristics 324 for downlink transmission from network 112 over wireless link 125. The uplink and downlink VoLTE handover characteristics 322, 324 may define one or more settings or parameters to be utilized by VoLTE call 312 for uplink and downlink communication from UE 114 and network 112. Additionally, uplink and downlink VoLTE handover characteristics 322, 324 may also be utilized by UE 114 as a template for configuring other types of IP connections between UE 114 and network 112, e.g., HSPA PS based handover.

In another aspect, call processing component 140 is configured to include configuring component 246 capable of configuring uplink HSPA PS based handover characteristics that emulate the uplink VoLTE handover characteristics for the uplink transmission to the network. For example, after identifying uplink VoLTE handover characteristics 322 of VoLTE call 312, configuring component 246 is configured to configure uplink HSPA PS based handover characteristics 332 to match uplink VoLTE handover characteristics 322 for uplink transmission to network 112. In other words, configuring uplink HSPA PS based handover characteristics that emulate the uplink VoLTE handover characteristics comprises replicating at least a portion of the uplink VoLTE handover characteristics for use as the uplink HSPA PS based handover characteristics.

Additionally, configuring component 246 is capable of configuring downlink HSPA PS based handover characteristics that emulate the downlink VoLTE handover characteristics for the downlink transmission from the network. For example, after identifying downlink VoLTE handover characteristics 324 of VoLTE call 312, configuring component 246 is configured to configure downlink HSPA PS based handover characteristics 334 to match downlink VoLTE handover characteristics 324 for downlink transmission from network 112. In other words, configuring downlink HSPA PS based handover characteristics that emulate the downlink VoLTE handover characteristics comprises replicating at least a portion of the downlink VoLTE handover characteristics for use as the downlink HSPA PS based handover characteristics.

Both uplink and downlink HSPA PS based handover characteristics 332, 334 may then be utilized by UE 114 to transfer VoLTE call 312 to a UMTS (or a HSPA) PS based voice call. Indeed, by configuring uplink and downlink HSPA PS based handover characteristics 332, 334 to match uplink and downlink VoLTE handover characteristics 322, 324, UE 114 may then be able to emulate the VoLTE call 312 on a UMTS PS based system.

In another aspect, call processing component 140 is configured to include characteristics utilizing component 248 capable of utilizing the uplink HSPA PS based handover characteristics during the uplink transmission to the network and utilizing the downlink HSPA PS based handover characteristics during the downlink transmission from the network. For example, after configuring uplink and downlink HSPA PS based handover characteristics 332, 334 to emulate the uplink and downlink VoLTE handover characteristics 322, 324, characteristics utilizing component 248 is configured for utilizing uplink and downlink HSPA PS based handover characteristics 332, 334 during the uplink transmission to network 112 and the downlink transmission from network 112.

For example, by configuring uplink and downlink HSPA PS based handover characteristics 332, 334 to match uplink and downlink VoLTE handover characteristics 322, 324 and utilizing the configured uplink and downlink HSPA PS based handover characteristics 332, 334, UE 114 may essentially emulate a HSPA PS based call operation during a VoLTE call. Namely, by employing the operation of the receiving component 242, identifying component 244, configuring component 246, and characteristics utilizing component 248, UE 114 may be configured to transfer received VoLTE call 312 to a HSPA PS based voice call both for uplink transmission to network 112 and downlink transmission from network 112.

In yet another aspect, call processing component 140 is configured to include uplink/downlink enhancement determining component 350 that is capable of modifying characteristics of in a radio link control (RLC) layer and a medium access control (MAC) layer in the uplink transmission to network 112 and the downlink transmission from network 112. These transmission characteristics are exemplary characteristics that may be configured and/or modified to emulate uplink and downlink VoLTE handover characteristics for the uplink and downlink transmission from network 112. For example, uplink/downlink enhancement determining component 350 may be configured to determine specification enhancements for UE 114 during the uplink transmission to network 112. These specification enhancements may not be typically part of the operating procedure for UE 114 when communicating with network 112 during a VoLTE call or a UMTS PS based voice call.

In some instances, certain characteristics in the RLC layer in the uplink transmission to network 112 may be modified or enhanced. For instance, when uplink/downlink enhancement determining component 350 determines that characteristics of the RLC layer of UE 114 are to be modified for the uplink transmission, uplink transmission modifying component 352 may be configured to modify those characteristics of the RLC layer of UE 114.

Specifically, modifying or configuring characteristics in the RLC layer for the uplink transmission of UE 114, via uplink transmission modifying component 352, may include but is not limited to one or more of excluding retransmissions in the uplink transmission from UE 114 to network 112, excluding buffering of uplink voice frames in the uplink transmission of a voice data buffer from UE 114 to the network 112, forwarding an uplink RLC transmission sliding window of UE 114 upon receiving acknowledgment (ACK) from network 112, and initiating a discard procedure at UE 114 upon receiving negative acknowledgment (NAK) from network 112. Indeed, as noted above, these uplink transmission characteristics in the RLC layer may be configured and/or modified in order to emulate uplink VoLTE handover characteristics for the uplink transmission to network 112.

When excluding retransmissions in the uplink transmission, UE 114 may be configured to modify the RCL layer such that upon receiving a downlink NAK from network 112, certain uplink retransmission triggers are excluded in the RLC layer, such as polling that triggers the status of uplink PDUs transmission based on 3GPP RLC specification, to reduce unnecessary retransmissions of protocol data units (PDUs) during the uplink transmission to network 112.

Moreover, when excluding buffering of uplink voice frames in the uplink transmission of a voice data buffer, UE 114 may be configured to flush or empty current voice frames in an RLC uplink buffer upon the arrival of new data or voice frames into the RLC uplink buffer. It should be noted that the current RLC uplink buffer may be zero according to the current uplink grant limitations.

Additionally, when forwarding an uplink RLC transmission sliding window upon receiving ACK from network 112, UE 114 may be configured to continue uplink transmission to minimize the loss of PDUs during the uplink transmission to network 112. The sliding window mechanism is used in data transmission for flow control when RLC transmission blocks inside a window are transmitted or re-transmitted. For example, the window will be advanced when an ACK is received for all transmitted blocks the RLC transmissions from network 112.

In another aspect, when initiating a discard procedure at UE 114 upon receiving NAK from network 112, UE 114 may be configured to have the capability of either initiating a timer based discard procedure, a Move Receiving Window (MRW) discard procedure, and a RESET based discard procedure instead of performing uplink retransmission such as exhausting RLC retransmission mechanisms. It should be noted that the state variable and parameter (such as VT(DAT)/maxDAT) and related logic for exhausting RLC retransmission are specified in 3GPP RLC specification.

The discard procedure according to the timer based discard procedure according to 3GPP RLC specification, may take place after a certain period of time or after a certain amount of data is no longer being transmitted on the uplink transmission.

The discard procedure according to the MRW discard procedure may involve informing the network to continue uplink transmission processing until the UE receives a MRW_ACK in the downlink transmission from the network. For example, upon receiving a RLC NAK from network 112, UE 114 may trigger the MRW discard procedure and inform network 112 to continue uplink transmission processing without waiting for retransmission in the uplink transmission for lost PDUs. In such an example, data flows continuously in the uplink transmission to network 112 while UE 114 waits for MRW_ACK in the downlink transmission from network 112. As such, data loss at network 112 RLC is limited to PDUs lost in the air interface between UE 114 and network 112.

It should be noted that to improve the reliability of initiating a MRW discard procedure according to 3GPP RLC specification, UE 114 may also override the RLC configuration parameters of Timer MRW and Max MRW, where Timer_MRW is the expiration of timer of each MRW SUFI PDU transmission and Max MRW is maximum number of attempts of MRW SUFI PDU transmission according to 3GPP RLC Specification.

The discard procedure according to the RESET based discard procedure may involve informing the network to conclude uplink transmission processing until the UE receives a RESET_ACK in the downlink transmission from the network. For example, upon receiving the maximum number of NAKs corresponding to a transmitted uplink RLC PDU from network 112, UE 114 may trigger the RESET based discard procedure such that no uplink transmission may occur until a RESET_ACK is received in the downlink from network 112 which indicates that UE 114 may conclude the RESET based discard procedure. When UE 114 receives RESET_ACK, the RESET based discard procedure is discontinued and uplink transmission will continue between UE 114 and network 112.

Furthermore, during the RESET based discard procedure, all uplink data in the RLC transmission buffers will be flushed or emptied. As such, loss of PDUs to network 112 based on initiation of the RESET based discard procedure may be limited to two RLC round-trip time (RTT) traffic in the uplink transmission (one half RLC RTT for receiving a NAK, one RCL RTT for the RESET based discard procedure, and one half RLC RTT for new data to reach network 112).

It should be noted that to improve the reliability of initiating a RESET based discard procedure, UE 114 may also override the RLC configuration parameters of Timer RESET and Max RESET, where Timer_RESET is the expiration of timer of each RESET SUFI PDU transmission and Max RESET is maximum number of attempts of RESET SUFI PDU transmission according to 3GPP RLC Specification.

Similar to modifying characteristics in the RLC layer during uplink transmission to network 112, modifying characteristics in the MAC layer for the uplink transmission may also occur. For example, when uplink/downlink enhancement determining component 350 determines that characteristics of the MAC layer of UE 114 are to be modified for the uplink transmission, uplink transmission modifying component 352 is configured to modify those characteristics of the MAC layer of UE 114.

Specifically, modifying characteristics in the MAC layer for the uplink transmission of UE 114, via uplink transmission modifying component 352, may include but is not limited to excluding partial PDUs transmission for the uplink transmission from UE 114 to network 112. For example, UE 114 may be configured to exclude partial PDUs transmissions to network 112 such that only a complete PDU is transmitted to network 112 even if the uplink transmission grant on the MAC layer allows for an uplink of partial PDUs transmissions. Indeed, as noted above, these uplink transmission characteristics in the MAC layer may be configured and/or modified in order to emulate uplink VoLTE handover characteristics for the uplink transmission to network 112.

As discussed above, uplink/downlink enhancement determining component 350 may be configured to determine specification enhancements for UE 114 during the uplink transmission to network 112 and downlink transmission from network 112. For example, uplink/downlink enhancement determining component 350 may be configured to determine specification enhancements for UE 114 during the downlink transmission from network 112. Again, these specification enhancements may not be typically part of the operating procedure for UE 114 when communicating with network 112 during a VoLTE call or a UMTS PS based voice call.

In some instances, characteristics in the RLC layer in the downlink transmission from network 112 may be modified or enhanced. For instance, when uplink/downlink enhancement determining component 350 determines that characteristics of the RLC layer of UE 114 are to be modified for the downlink transmission, downlink transmission modifying component 354 is configured to modify those characteristics of the RLC layer of UE 114.

Specifically, modifying characteristics in the RLC layer for the downlink transmission of UE 114, via downlink transmission modifying component 354, may include but is not limited to one or more of positively acknowledging all received downlink RLC protocol data units (PDUs) by the UE during the downlink transmission, excluding retransmissions requests in the downlink transmission at the UE, excluding buffering of downlink voice frames in the UE downlink reassembly queue in the downlink transmission, and detecting of a missing PDU trigger. Indeed, as noted above, these downlink transmission characteristics in the RLC layer may be configured and/or modified in order to emulate downlink VoLTE handover characteristics for the downlink transmission from network 112.

When positively acknowledging all received downlink RLC PDUs during the downlink transmission, UE 114 may be configured to make no special exception to acknowledging the downlink RLC PDUs during downlink transmission from network 112.

Moreover, when excluding retransmissions requests in the downlink transmission, UE 114 may be configured to modify the RCL layer to exclude retransmissions requests when an ACK SUFI is transmitted with Vr(R)=Vr(H) on the downlink transmission from network 112, according to 3GPP RLC Specification.

Additionally, when excluding buffering of downlink voice frames in the UE downlink reassembly queue in the downlink transmission. UE 114 may be configured to reassemble all the received PDUs up to the highest signal (SN) Vr(H). While this may leave holes or gaps in the RLC SN, UE 114 may then fill in the gaps of the RLC SN based on the Vr(H) for every transmission time interval (TTI) according to 3GPP RLC Specification.

In another aspect, when detecting of a missing PDU trigger, UE 114 may be configured to always detect the loss of PDUs according to a received status PDU. For example, by analyzing the status PDU and determine that PDUs are missing, UE 114 may reduce the number of PDUs lost to early trigger downlink RLC retransmission or to avoid any downlink RLC retransmission during downlink transmission from network 112.

It should be noted that when UE 114 modifies characteristics in the RLC layer for the downlink transmission from network 112 may include overriding certain RLC configuration parameters for the downlink transmission, wherein the certain RLC configuration parameters include a timer status trigger and a timer status prohibit, according 3GPP RLC specification, so that downlink RLC PDU retransmission can be triggered earlier or more frequently than the RLC configuration expects. In this manner, voice frame delay or jitter may be optimized.

Similar to modifying characteristics in the RLC layer during downlink transmission from network 112, modifying characteristics in the MAC layer for the downlink transmission may also occur. For example, when uplink/downlink enhancement determining component 350 determines that characteristics of the MAC layer of UE 114 are to be modified for the downlink transmission, downlink transmission modifying component 354 is configured to modify those characteristics of the MAC layer of UE 114.

Specifically, modifying characteristics in the MAC layer for the downlink transmission of UE 114, via downlink transmission modifying component 354, may include but is not limited to excluding partial PDUs in the downlink transmission to the UE and excluding buffering of downlink Transmission Sequence Number (TSN) in a medium access control-high speed (MAC-HS) reassemble window so that the buffering delay at the downlink MAC layer can be reduced for the voice frames. Indeed, as noted above, these downlink transmission characteristics in the MAC layer may be configured and/or modified in order to emulate downlink VoLTE handover characteristics for the downlink transmission from network 112.

For example, when excluding partial PDUs in the downlink transmission, UE 114 may be configured to exclude partial PDUs in the downlink transmission from network 112 such that only complete PDUs are processed even if the downlink transmission grant on the MAC layer allows for partial downlink transmission of partial PDUs.

In another aspect, when excluding buffering of downlink TSN in the MAC-HS reassemble window, UE 114 may be configured to exclude buffering of downlink TSN MAC-HS reassemble window such that every received TSN will be accepted in the MACh HS reassemble window and processed immediately, without validating the inside/outside TSN window so that the buffering delay at the downlink MAC layer can be reduced for the voice frames. In other words, the next expected TSN and other window parameters are updated with respect to the highest processed downlink transmission from network 112.

Thus, after uplink/downlink enhancement determining component 350 determines the modifications of the RCL layer and MAC layer for the uplink transmission and downlink transmission, call processing component 140 may be able to provide UE 114 the ability to accurately transfer a VoLTE call from network 112 to a HSPA PS based voice call.

Figure 4:
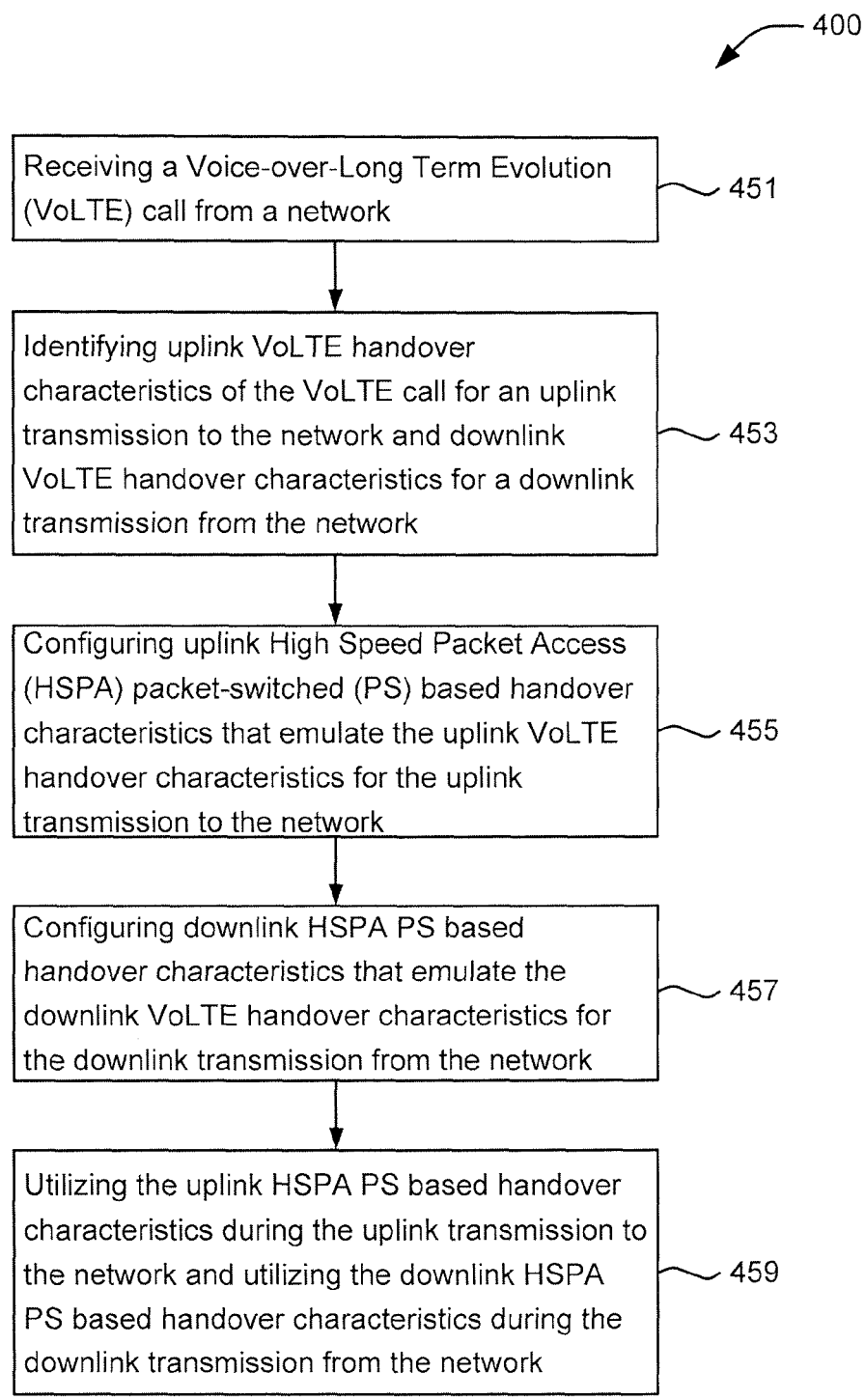
FIG. 4 is a flow diagram illustrating an aspect of a method of call processing at a UE in a wireless communication system.

FIG. 4 is a flow diagram illustrating an aspect of a method 400 of the wireless communication system of FIGS. 1 and 2. At 451, method 400 includes receiving a VoLTE call from a network. For example, with reference to FIG. 2, receiving component 242, located within UE 114, may be configured to receive VoLTE call 312 from network 112 via wireless serving node 116 over wireless link 125.

At 453, method 400 includes identifying uplink VoLTE handover characteristics of the VoLTE call for an uplink transmission to the network and downlink VoLTE handover characteristics for downlink transmission from the network. For example, after receiving VoLTE call 312 from network 112, identifying component 244, located within UE 114, may be configured to identify uplink VoLTE handover characteristics 322 of VoLTE call 312 for an uplink transmission to network 112 and downlink VoLTE handover characteristics 324 for downlink transmission from network 112 over wireless link 125. The uplink and downlink VoLTE handover characteristics 322, 324 defines one or more settings or parameters to be utilized by VoLTE call 312 and provide a template for configuring other types of IP connections between UE 114 and network 112.

At 455, method 400 includes configuring uplink HSPA PS based handover characteristics that emulate the uplink VoLTE handover characteristics for the uplink transmission to the network. For example, after identifying uplink VoLTE handover characteristics 322 of VoLTE call 312 for the uplink transmission to network 112, configuring component 246, located within UE 114, may be configured to configure uplink HSPA PS based handover characteristics 332 to match uplink VoLTE handover characteristics 322 for uplink transmission to network 112. Indeed, by configuring uplink HSPA PS based handover characteristics 332 to match uplink VoLTE handover characteristics 322, UE 114 may be able to emulate the VoLTE call 312 on a UMTS PS based system on the uplink to network 112.

At 457, method 400 includes configuring downlink HSPA PS based handover characteristics that emulate the downlink VoLTE handover characteristics for the downlink transmission from the network. For example, after identifying downlink VoLTE handover characteristics 324 of VoLTE call 312, configuring component 246, located in UE 114, may be configured to configure downlink HSPA PS based handover characteristics 334 to match downlink VoLTE handover characteristics 324 for downlink transmission from network 112. Indeed, by configuring downlink HSPA PS based handover characteristics 334 to match downlink VoLTE handover characteristics 324, UE 114 may then be able to emulate the VoLTE call 312 on a UMTS PS based system on the downlink from network 112.

At 459, method 400 includes utilizing the uplink HSPA PS based handover characteristics during the uplink transmission to the network and utilizing the downlink HSPA PS based handover characteristics during the downlink transmission from the network. For example, after configuring uplink and downlink HSPA PS based handover characteristics 332, 334 to emulate the uplink and downlink VoLTE handover characteristics 322, 324, characteristics utilizing component 248, located within UE 114, may be configured for utilizing uplink and downlink HSPA PS based handover characteristics 332, 334 during the uplink transmission to network 112 and the downlink transmission from network 112. Characteristics utilizing component 248 may also be configured to modify the RCL layer and the MAC layer based on the out-of-standard-spec enhancement for UE 114 during the uplink transmission and the downlink transmission.

Thus, UE 114 may be configured to transfer received VoLTE call 312 to a HSPA PS based voice call both for uplink transmission to network 112 and downlink transmission from network 112.

In an aspect, for example, method 400 may be operated by UE 114 or network 112 (FIGS. 1 and 2) executing the call processing component 140 (FIGS. 1-3), or respective subcomponents thereof.

Figure 5:
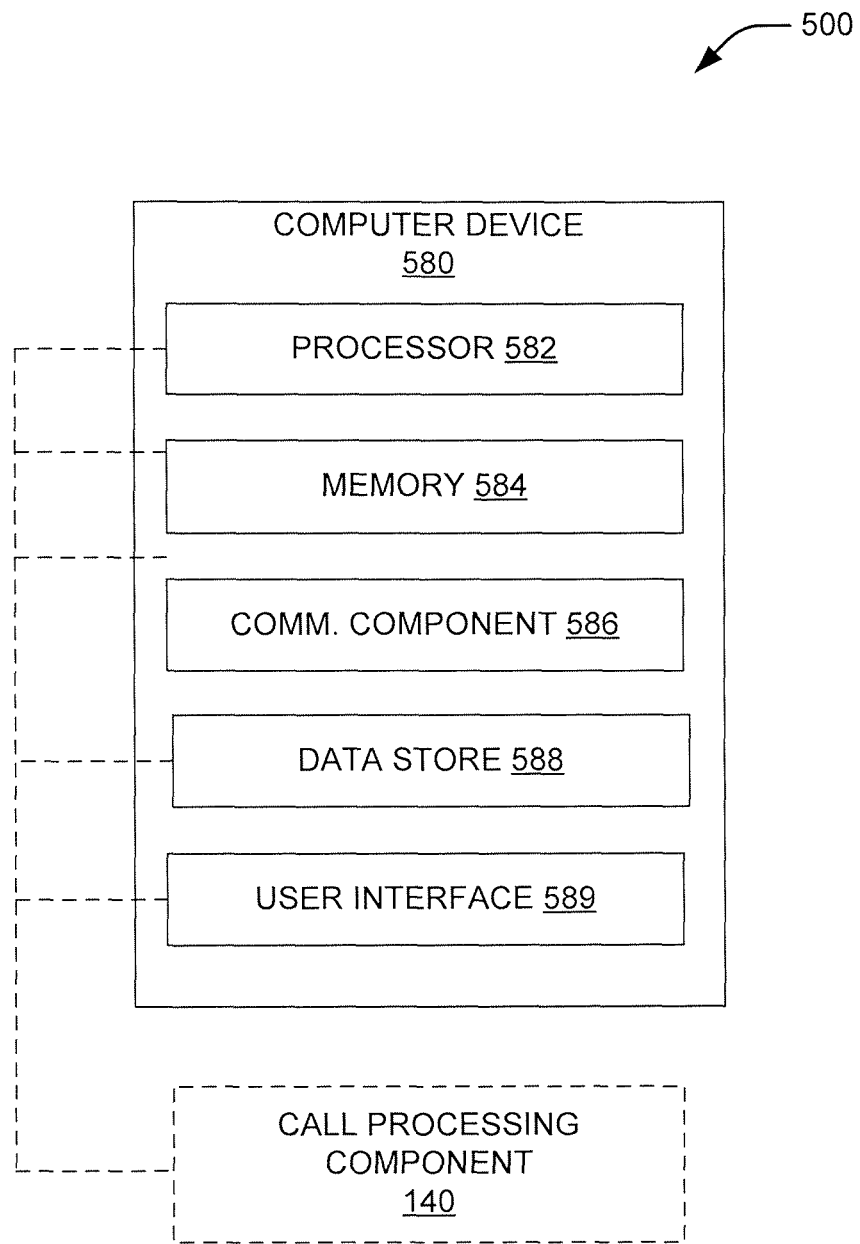
FIG. 5 is a block diagram illustrating aspects of a computer device including a call processing component according to the present disclosure.

Referring to FIG. 5, in one aspect, UE 114, including call processing component 140 (FIGS. 1-3), may be represented by a specially programmed or configured computer device 500. In one aspect, computer device 500 may include call processing component 140 (FIGS. 1-3), such as in a specially programmed computer readable instructions or code, firmware, hardware, or some combination thereof. Computer device 500 includes a processor 502 for carrying out processing functions associated with one or more of components and functions described herein, such as receiving component 242, identifying component 244, configuring component 246, and characteristics utilizing component 248. Processor 502 can include a single or multiple set of processors or multi-core processors. Moreover, processor 502 can be implemented as an integrated processing system and/or a distributed processing system.

Computer device 500 further includes a memory 504, such as for storing data used herein and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, computer device 500 includes a communications component 506 that provides for establishing and maintaining communications with one or more parties utilizing hardware, software, and services as described herein. Communications component 506 may carry communications between components on computer device 500, as well as between computer device 500 and external devices, such as devices located across a communications network and/or devices serially or locally connected to computer device 500. For example, communications component 506 may include one or more buses, and may further include transmit chain components and receive chain components associated with a transmitter and receiver, respectively, or a transceiver, operable for interfacing with external devices. In an additional aspect, communications component 506 may be configured to receive one or more pages from one or more subscriber networks. In a further aspect, such a page may correspond to the second subscription and may be received via the first technology type communication services.

Additionally, computer device 500 may further include a data store 508, which can be any suitable combination of hardware and/or software, that provides for mass storage of information, databases, and programs employed in connection with aspects described herein. For example, data store 508 may be a data repository for applications not currently being executed by processor 502 and/or any threshold values or finger position values.

Computer device 500 may additionally include a user interface component 510 operable to receive inputs from a user of computer device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof.

Further, user interface component 510 may include one or more output devices, including but not limited to a display, a speaker, a haptic feedback mechanism, a printer, any other mechanism capable of presenting an output to a user, or any combination thereof.

Figure 6:
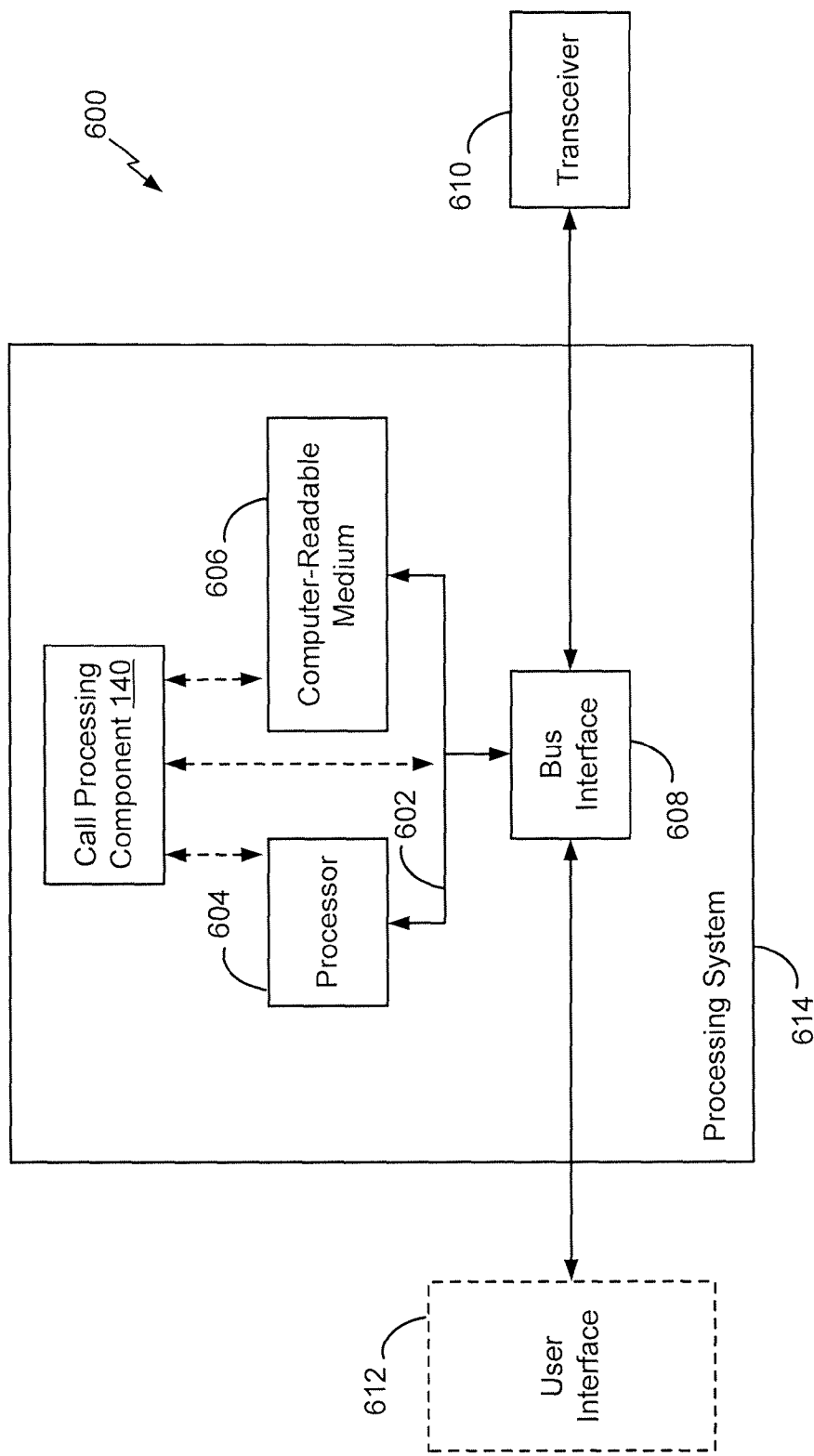
FIG. 6 is a block diagram illustrating an example of a hardware implementation for an apparatus employing a processing system executing a call processing component to perform the functions described herein.

FIG. 6 is a block diagram illustrating an example of a hardware implementation for an apparatus 600, for example, including call processing component 140 (FIGS. 1-3), employing a processing system 614 for carrying out aspects of the present disclosure, such as method 400 for transferring a received VoLTE call 312 to an HSPA PS based voice call. In this example, the processing system 614 may be implemented with bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 607, and one or more components described herein, such as, but not limited to, call processing component 140 (FIGS. 1-3). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 607. The software, when executed by the processor 604, causes the processing system 614 to perform the various functions described infra for any particular apparatus. The computer-readable medium 607 may also be used for storing data that is manipulated by the processor 604 when executing software.

Figure 7:
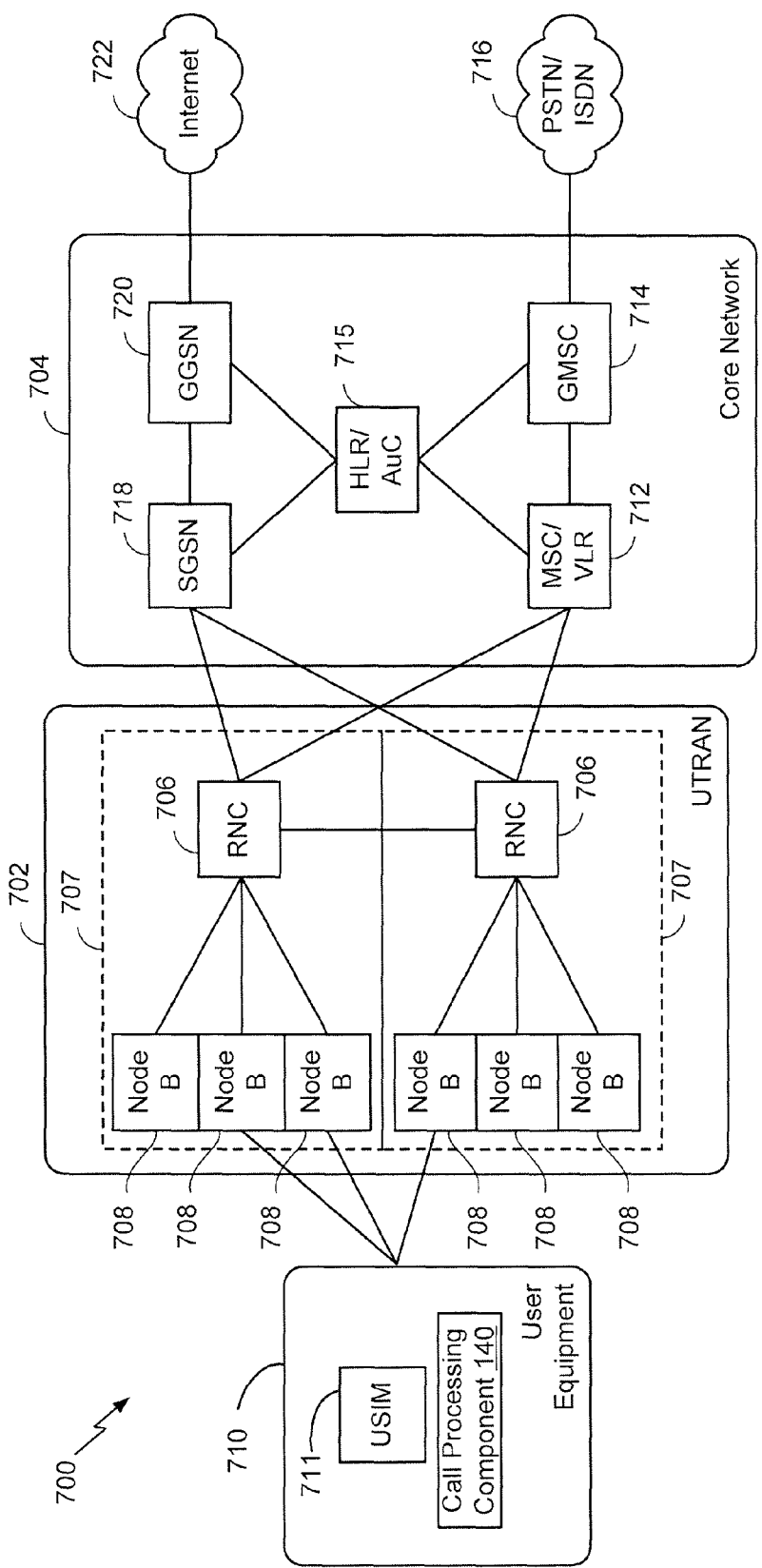
FIG. 7 is a block diagram conceptually illustrating an example of a telecommunications system including a UE configured to perform the functions described herein.

Referring to FIG. 7, by way of example and without limitation, the aspects of the present disclosure are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. UE 710 may be configured to include, for example, the call processing component 140 (FIGS. 1-3) for transferring a received VoLTE call 312 to a HSPA PS based voice call by implementing the components described above, such as receiving component 242, identifying component 244, configuring component 246, and characteristics utilizing component 248. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 706. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a medium access control (MAC) layer. Further, communication between a UE 710 and an RNC 706 by way of a respective Node B 708 may be considered as including a radio resource control (RRC) layer. As used herein, the PHY layer may be considered layer 1, the MAC layer may be considered layer 2, and the RRC layer may be considered layer 3. Information herein may utilize terminology introduced in the RRC Protocol Specification, 3GPP TS 24.331, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 710 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 714 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 714 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the node B 708 over the HS-DPCCH to indicate whether it correctly decoded a packet on the downlink.

HS-DPCCH further includes feedback signaling from the UE 710 to assist the node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 84-QAM, enabling increased throughput and higher performance. That is, in an aspect of the disclosure, the node B 708 and/or the UE 710 may have multiple antennas supporting MIMO technology. The use of MIMO technology enables the node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate, or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
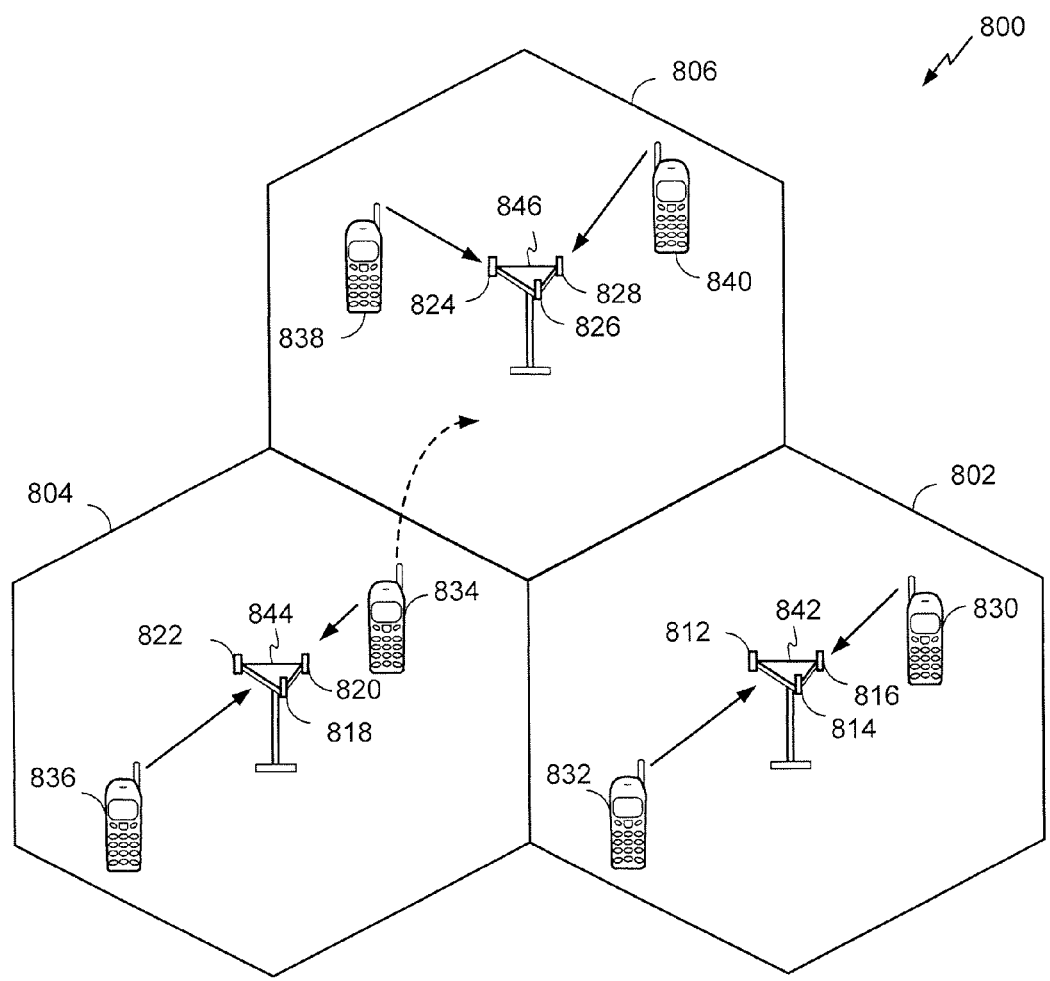
FIG. 8 is a conceptual diagram illustrating an example of an access network for use with a UE configured to perform the functions described herein.

Referring to FIG. 8, an access network 800 in a UTRAN architecture is illustrated. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a CN 704 (see FIG. 7) for all the UEs 830, 832, 834, 836, 838, 840 in the respective cells 802, 804, and 806. Node Bs 842, 844, 846 and UEs 830, 832, 834, 836, 838, 840 respectively may be configured to include, for example, the call processing component 140 (FIGS. 1-3) for transferring a received VoLTE call 312 to a HSPA PS based voice call by implementing the components described above, such as receiving component 242, identifying component 244, configuring component 246, and characteristics utilizing component 248.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
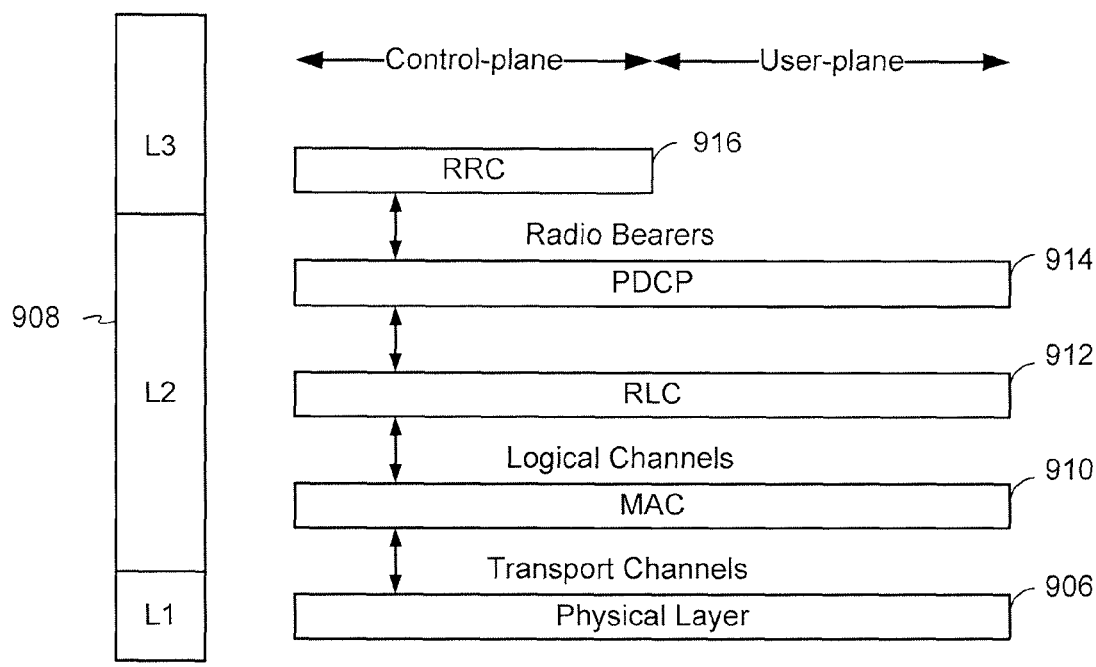
FIG. 9 is a conceptual diagram illustrating an example of a radio protocol architecture for the user and control planes for a base station and/or a UE configured to perform the functions described herein.

FIG. 9 is a conceptual diagram illustrating an example of the radio protocol architecture 900 for the user plane and the control plane of a user equipment (UE) or node B/base station. For example, architecture 900 may be included in a network entity and/or UE such as an entity within network 112 and/or UE 114 (FIGS. 1 and 2). The radio protocol architecture 900 for the UE and node B is shown with three layers 908: Layer 1, Layer 2, and Layer 3. Layer 1 is the lowest lower and implements various physical layer signal processing functions. As such, Layer 1 includes the physical layer 906. Layer 2 (L2 layer) is above the physical layer 906 and is responsible for the link between the UE and node B over the physical layer 906. Layer 3 (L3 layer) includes a radio resource control (RRC) sublayer 916. The RRC sublayer 916 handles the control plane signaling of Layer 3 between the UE and the UTRAN.

In the user plane, the L2 layer includes a media access control (MAC) sublayer 910, a radio link control (RLC) sublayer 912, and a packet data convergence protocol (PDCP) 914 sublayer, which are terminated at the node B on the network side. Although not shown, the UE may have several upper layers above the L2 layer including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between node Bs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

Figure 10:
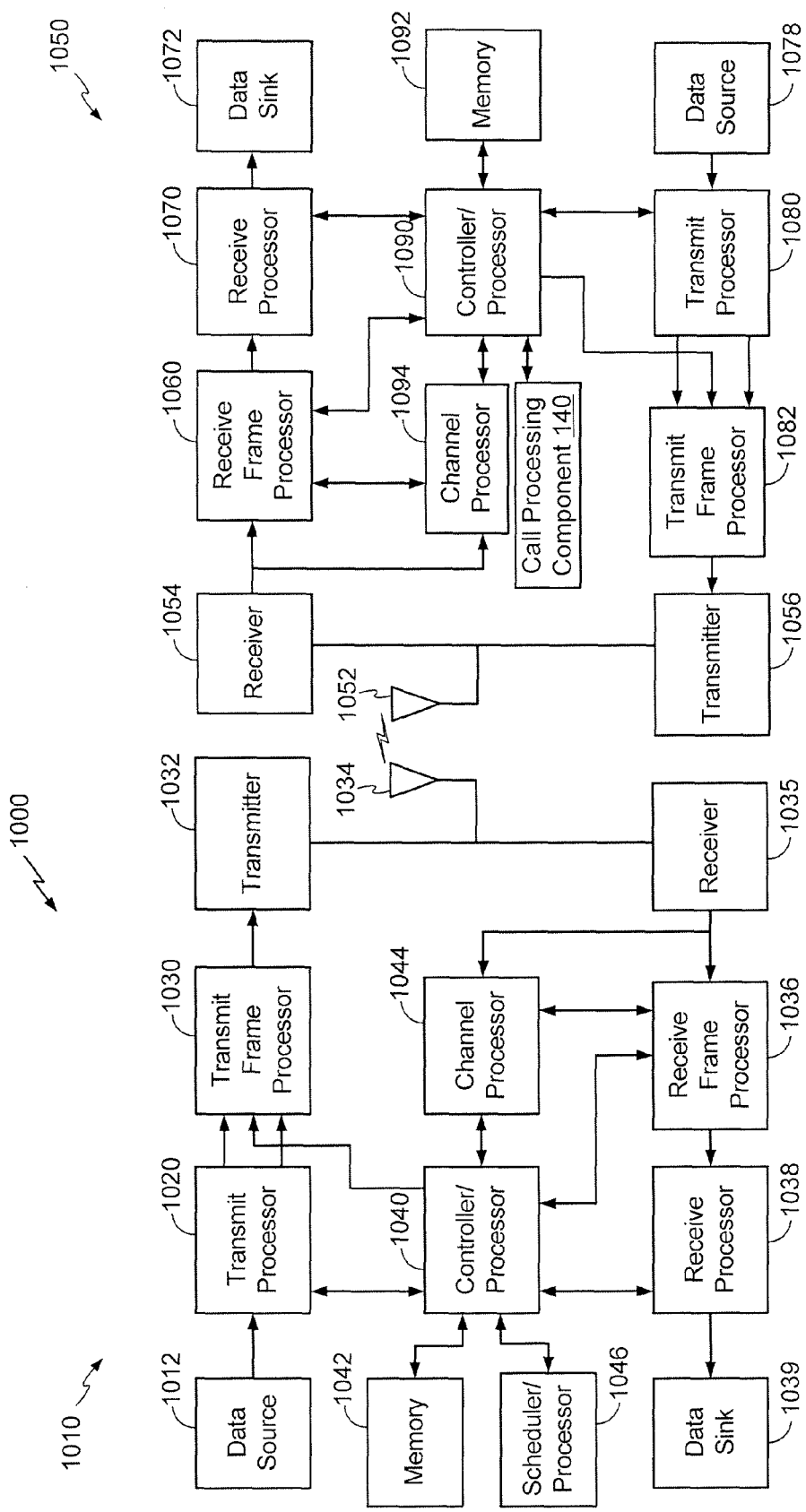
FIG. 10 is a block diagram conceptually illustrating an example of a Node B in communication with a UE in a telecommunications system configured to perform the functions described herein.

FIG. 10 is a block diagram of a communication system 1000 including a Node B 1010 in communication with a UE 1040, where Node B 1010 may be an entity within network 112 and the UE 1040 may be UE 114 according to the aspect described in FIGS. 1-4. UE 1040 may be configured to include, for example, the call processing component 140 (FIGS. 1-3) for transferring a received VoLTE call 312 to a HSPA PS based voice call by implementing the components described above, such as receiving component 242, identifying component 244, configuring component 246, and characteristics utilizing component 248. In the downlink communication, a transmit processor 1020 may receive data from a data source 1016 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1040 or from feedback from the UE 1040. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1040, a receiver 1044 receives the downlink transmission through an antenna 1042 and processes the transmission to recover the information modulated onto the carrier. The information recovered by the receiver 1044 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1040 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1040 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1046, which provides various signal conditioning functions including amplification, filtering, and modulating the frames onto a carrier for uplink transmission over the wireless medium through the antenna 1042.

The uplink transmission is processed at the Node B 1010 in a manner similar to that described in connection with the receiver function at the UE 1040. A receiver 1034 receives the uplink transmission through the antenna 1034 and processes the transmission to recover the information modulated onto the carrier. The information recovered by the receiver 1034 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1040. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1040, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1040, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.10 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 5 or 6) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606 (FIG. 6). The computer-readable medium 606 (FIG. 6) may be a non-transitory computer-readable medium.

A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 34 U.S.C. §112, sixth paragraph, unless the element is expressly recited using the phrase "means for" or, in the case of a method claim, the element is recited using the phrase "step for."

What is claimed is:

1. A method of wireless communication, comprising:
    receiving, at a user equipment UE), a Voice-over-Long Term Evolution (VoLTE) call from a network having uplink VoLTE handover characteristics for an uplink transmission to the network and downlink VoLTE handover characteristics for a downlink transmission from the network;
    transferring the VoLTE call to a High Speed Packet Access (HSPA) packet-switched (PS) based voice call;
    configuring, by the UE, uplink HSPA PS based handover characteristics that emulate the uplink VoLTE handover characteristics for the uplink transmission to the network, wherein configuring the uplink HSPA PS based handover characteristics includes excluding radio link control (RLC) layer retransmissions in the uplink transmission from the UE to the network by excluding RLC layer retransmission triggers in response to receiving a downlink negative acknowledgment;
    configuring, by the UE, downlink HSPA PS based handover characteristics that emulate the downlink VoLTE handover characteristics for the downlink transmission from the network, wherein the downlink HSPA PS based handover characteristics exclude RLC layer retransmission requests for downlink transmissions; and
    utilizing the uplink HSPA PS based handover characteristics during the uplink transmission to the network and utilizing the downlink HSPA PS based handover characteristics during the downlink transmission from the network.

2. The method of claim 1, wherein configuring uplink HSPA PS based handover characteristics that emulate the uplink VoLTE handover characteristics comprises replicating at least a portion of the uplink VoLTE handover characteristics for use as the uplink HSPA PS based handover characteristics, and
    wherein configuring downlink HSPA PS based handover characteristics that emulate the downlink VoLTE handover characteristics comprises replicating at least a portion of the downlink VoLTE handover characteristics for use as the downlink HSPA PS based handover characteristics.

3. The method of claim 1, further comprising modifying characteristics in the RLC layer and a medium access control (MAC) layer for the uplink transmission.

4. The method of claim 3, wherein modifying characteristics in the RLC layer for the uplink transmission further comprises:
    excluding buffering of uplink voice frames in the uplink transmission of a voice data buffer from the UE to the network;
    forwarding an uplink RLC transmission sliding window of the UE upon receiving acknowledgment (ACK) from the network; and
    initiating a discard procedure at the UE upon receiving negative acknowledgment (NAK) from the network, wherein the discard procedure includes a timer based discard procedure, a Move Receiving Window (MRW) discard procedure, and a RESET based discard procedure.

5. The method of claim 3, wherein modifying characteristics in the MAC layer for the uplink transmission further comprises excluding partial protocol data units (PDUs) transmission for the uplink transmission from the UE to the network.

6. The method of claim 1, further comprising modifying characteristics in the RLC layer and a MAC layer for the downlink transmission.

7. The method of claim 6, wherein modifying characteristics in the RLC layer for the downlink transmission further comprises:
    positively acknowledging all received downlink RLC protocol data units (PDUs) by the UE during the downlink transmission;

excluding buffering of downlink voice frames in a UE downlink reassembly queue in the downlink transmission; and detecting a missing PDU trigger.

8. The method of claim 7, further comprising overriding certain RLC configuration parameters for the downlink transmission, wherein the certain RLC configuration parameters include a timer status trigger and a timer status prohibit.

9. The method of claim 6, wherein modifying characteristics in the MAC layer for the downlink transmission further comprises:

excluding partial PDUs in the downlink transmission to the UE; and excluding buffering of downlink Transmission Sequence Number (TSN) in a medium access control-high speed (MAC-HS) reassemble window.

10. An apparatus of wireless communication, comprising:

at least one processor; and:

a memory coupled to the at least one processor, wherein the at least one processor is configured to:

receive, at a user equipment (UE), a Voice-over-Long Term Evolution (VoLTE) call from a network having uplink VoLTE handover characteristics for an uplink transmission to the network and downlink VoLTE handover characteristics for a downlink transmission from the network;

transfer the VoLTE call to a High Speed Packet Access (HSPA) packet-switched (PS) based voice call;

configure, by the UE, uplink HSPA PS based handover characteristics that emulate the uplink VoLTE handover characteristics for the uplink transmission to the network, wherein the uplink HSPA PS based handover characteristics exclude radio link control (RLC) layer retransmissions in the uplink transmission from the UE to the network by excluding RLC layer retransmission triggers in response to receiving a downlink negative acknowledgment;

configure, by the UE, downlink HSPA PS based handover characteristics that emulate the downlink VoLTE handover characteristics for the downlink transmission from the network, wherein the downlink HSPA PS based handover characteristics exclude RLC layer retransmission requests for downlink transmissions; and utilize the uplink HSPA PS based handover characteristics during the uplink transmission to the network and utilizing the downlink HSPA PS based handover characteristics during the downlink transmission from the network.

11. The apparatus of claim 10, wherein the at least one processor configured to configure uplink HSPA PS based handover characteristics that emulate the uplink VoLTE handover characteristics is further configured to replicate at least a portion of the uplink VoLTE handover characteristics for use as the uplink HSPA PS based handover characteristics, and wherein the at least one processor configured to configure downlink HSPA PS based handover characteristics that emulate the downlink VoLTE handover characteristics is further configured to replicate at least a portion of the downlink VoLTE handover characteristics for use as the downlink HSPA PS based handover characteristics.

12. The apparatus of claim 10, wherein the at least one processor is further configured to modify characteristics in the RL layer and a medium access control (MAC) layer for the uplink transmission.

13. The apparatus of claim 12, wherein the at least one processor configured to modify characteristics in the RLC layer for the uplink transmission is further configured to:

exclude buffering of uplink voice frames in the uplink transmission of a voice data buffer from the UE to the network;

forward an uplink RLC transmission sliding window of the UE upon receiving acknowledgment (ACK) from the network; and initiate a discard procedure at the UE upon receiving negative acknowledgment (NAK) from the network, wherein the discard procedure includes a timer based discard procedure, a Move Receiving Window (MRW) discard procedure, and a RESET based discard procedure.

14. The apparatus of claim 12, wherein the at least one processor configured to modify characteristics in the MAC layer for the uplink transmission is further configured to exclude partial protocol data units (PDUs) transmission for the uplink transmission from the UE to the network.

15. The apparatus of claim 10, wherein the at least one processor is further configured to modify characteristics in the RLC layer and a medium access control (MAC) layer for the downlink transmission.

16. The apparatus of claim 15, wherein the at least one processor configured to modify characteristics in the RLC layer for the downlink transmission is further configured to:

positively acknowledge all received downlink RLC protocol data units (PDUs) by the UE during the downlink transmission;

exclude buffering of downlink voice frames in a UE downlink reassembly queue in the downlink transmission; and detect a missing PDU trigger.

17. The apparatus of claim 16, wherein the at least one processor is further configured to override certain RLC configuration parameters for the downlink transmission, wherein the certain RLC configuration parameters include a timer status trigger and a timer status prohibit.

18. The apparatus of claim 15, wherein the at least one processor configured to modify characteristics in the MAC layer for the downlink transmission further comprises:

exclude partial PDUs in the downlink transmission to the UE; and exclude buffering of downlink Transmission Sequence Number (TSN) in a medium access control-high speed (MAC-HS) reassemble window.

19. An apparatus of wireless communication, comprising:

means for receiving, at a user equipment (UE), a Voice-over-Long Term Evolution (VoLTE) call from a network having uplink VoLTE handover characteristics for an uplink transmission to the network and downlink VoLTE handover characteristics for a downlink transmission from the network;

means for transferring the VoLTE call to a High Speed Packet Access (HSPA) packet-switched (PS) based voice call;

means for configuring uplink HSPA PS based handover characteristics that emulate the uplink VoLTE handover characteristics for the uplink transmission to the network, wherein the uplink HSPA PS based handover characteristics exclude radio link control (RLC) layer retransmissions in the uplink transmission from the UE to the network by excluding RLC layer retransmission triggers in response to receiving a downlink negative acknowledgment;

means for configuring downlink HSPA PS based handover characteristics that emulate the downlink VoLTE handover characteristics for the downlink transmission from the network, wherein the downlink HSPA PS based handover characteristics exclude RLC layer retransmission requests for downlink transmissions; and means for utilizing the uplink HSPA PS based handover characteristics during the uplink transmission to the network and utilizing the downlink HSPA PS based handover characteristics during the downlink transmission from the network.

20. The apparatus of claim 19, wherein means for configuring uplink HSPA PS based handover characteristics that emulate the uplink VoLTE handover characteristics comprises replicating at least a portion of the uplink VoLTE handover characteristics for use as the uplink HSPA PS based handover characteristics, and wherein means for configuring downlink HSPA PS based handover characteristics that emulate the downlink VoLTE handover characteristics comprises replicating at least a portion of the downlink VoLTE handover characteristics for use as the downlink HSPA PS based handover characteristics.

21. The apparatus of claim 19, further comprising means for modifying characteristics in the RLC layer and a medium access control (MAC) layer for the uplink transmission.

22. The apparatus of claim 21, wherein means for modifying characteristics in the RLC layer for the uplink transmission further comprises:

means for excluding buffering of uplink voice frames in the uplink transmission of a voice data buffer from the UE to the network;

means for forwarding an uplink RLC transmission sliding window of the UE upon receiving acknowledgment (ACK) from the network; and means for initiating a discard procedure at the UE upon receiving negative acknowledgment (NAK) from the network, wherein the discard procedure includes a timer based discard procedure, a Move Receiving Window (MRW) discard procedure, and a RESET based discard procedure.

23. The apparatus of claim 21, wherein means for modifying characteristics in the MAC layer for the uplink transmission further comprises means for excluding partial protocol data units (PDUs) transmission for the uplink transmission from the UE to the network.

24. The apparatus of claim 19, further comprising means for modifying characteristics the RLC layer and a medium access control (MAC) layer for the downlink transmission.

25. The apparatus of claim 24, wherein means for modifying characteristics in the RLC layer for the downlink transmission further comprises:

means for positively acknowledging all received downlink RLC protocol data units (PDUs) by the UE during the downlink transmission;

means for excluding buffering of downlink voice frames in a UE downlink reassembly queue in the downlink transmission; and means for detecting a missing PDU trigger.

26. The apparatus of claim 25, further comprising means for overriding certain RLC configuration parameters for the downlink transmission, wherein the certain RLC configuration parameters include a timer status trigger and a timer status prohibit.

27. The apparatus of claim 24, wherein means for modifying characteristics in the MAC layer for the downlink transmission further comprises:

means for excluding partial PDUs in the downlink transmission to the UE; and means for excluding buffering of downlink Transmission Sequence Number (TSN) in a medium access control-high speed (MAC-HS) reassemble window.

28. A non-transitory computer readable medium, comprising machine-executable code for causing a computer to:

receive, at a user equipment (UE), a Voice-over-Long Term Evolution (VoLTE) call from a network having uplink VoLTE handover characteristics for an uplink transmission to the network and downlink VoLTE handover characteristics for a downlink transmission from the network;

transfer the VoLTE call to a High Speed Packet Access (HSPA) packet-switched (PS) based voice call;

configure, by the UE, uplink HSPA PS based handover characteristics that emulate the uplink VoLTE handover characteristics for the uplink transmission to the network, wherein the uplink HSPA PS based handover characteristics exclude radio link control, RLC, layer retransmissions in the uplink transmission from the UE to the network by excluding RLC layer retransmission triggers in response to receiving a downlink negative acknowledgment;

configure, by the UE, downlink HSPA PS based handover characteristics that emulate the downlink VoLTE handover characteristics for the downlink transmission from the network, wherein the downlink HSPA PS based handover characteristics exclude RLC layer retransmission requests for downlink transmissions; and utilize the uplink HSPA PS based handover characteristics during the uplink transmission to the network and utilizing the downlink HSPA PS based handover characteristics during the downlink transmission from the network.

* * * * *